(12) United States Patent
Morton et al.

(10) Patent No.: US 10,875,383 B2
(45) Date of Patent: Dec. 29, 2020

(54) FASTENING SYSTEM FOR A VEHICLE COMPONENT HOUSING

(71) Applicant: Ford Global Technologies, LLC, Dearborn, MI (US)

(72) Inventors: Jeffrey Morton, Royal Oak, MI (US); David Bryan McGeary, Orion, MI (US); Scott Allen Schaffer, Ypsilanti, MI (US); Robert D. Boyer, Livonia, MI (US); Roger Joseph Khami, Troy, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 351 days.

(21) Appl. No.: 15/926,226

(22) Filed: Mar. 20, 2018

(65) Prior Publication Data

US 2019/0291536 A1    Sep. 26, 2019

(51) Int. Cl.
| | |
|---|---|
| *B60H 1/00* | (2006.01) |
| *B60H 3/06* | (2006.01) |
| *F02M 35/02* | (2006.01) |
| *F02M 35/10* | (2006.01) |

(52) U.S. Cl.
CPC ..... *B60H 1/00535* (2013.01); *B60H 1/00528* (2013.01); *B60H 3/0608* (2013.01); *F02M 35/0202* (2013.01); *B60H 2001/00621* (2013.01); *B60H 2003/065* (2013.01); *F02M 35/10386* (2013.01)

(58) Field of Classification Search
CPC ...... B60H 1/00535; B60H 2001/00621; B60H 2003/065; B60H 1/00521; B60H 3/0658; F02M 35/0203

USPC ............ 55/385.3, 493, 495, 497; 123/198 E
See application file for complete search history.

(56) References Cited

U.S. PATENT DOCUMENTS

| | | | |
|---|---|---|---|
| 5,554,205 A * | 9/1996 | Ernst ................. | B01D 46/0005 |
| | | | 55/385.3 |
| 5,730,768 A | 3/1998 | Kaminaga et al. | |
| 8,568,502 B2 | 10/2013 | Khami et al. | |
| 9,359,982 B2 * | 6/2016 | Oh ..................... | B01D 46/0002 |
| 9,932,941 B2 * | 4/2018 | Khami ............... | B01D 46/0005 |
| 2012/0047856 A1 * | 3/2012 | Khami ............... | F02M 35/0203 |
| | | | 55/385.3 |
| 2016/0230713 A1 | 8/2016 | Khami et al. | |
| 2017/0191452 A1 | 7/2017 | Baek et al. | |

FOREIGN PATENT DOCUMENTS

| | | |
|---|---|---|
| CN | 103670826 B | 5/2016 |
| JP | H09177622 A | 7/1997 |
| JP | H09201509 A | 8/1997 |
| JP | 2012237425 A | 12/2012 |
| JP | 2016211403 A | 12/2016 |

* cited by examiner

*Primary Examiner* — Minh Chau T Pham
(74) *Attorney, Agent, or Firm* — Brooks Kushman P.C.; Geoffrey Brumbaugh (57) ABSTRACT

A vehicle component housing, such as for an air filtration assembly, includes a first shell having a mount defining a retention feature, and a second shell having a flange. A fastener has a hooked region rotatably supported by the mount and configured to selectively mate with the retention feature to retain the fastener in a disengaged position. The fastener has a locking member configured to mate with the flange to retain the fastener in an engaged position. The fastener may be a spring clip fastener.

16 Claims, 6 Drawing Sheets

FASTENING SYSTEM FOR A VEHICLE COMPONENT HOUSING

TECHNICAL FIELD

Various embodiments relate to fastening system for use with a component housing in a vehicle, including a fastening system for a vehicle air filtration housing.

BACKGROUND

Fasteners, such as spring clip fasteners, may be used to close and lock a housing, such as a housing for a vehicle air filter element or another vehicle component. The clips may become trapped, pinched, or otherwise interfere with closing the housing, for example, during a maintenance event.

SUMMARY

In an embodiment, an air filtration assembly for a vehicle is provided with an upper filter element casing having a mount defined by a post extending between first and second flanges. The mount further defines a retention feature. A lower filter element casing has a flange, and the upper and lower filter element casings mate via a compressible seal to enclose an interior region sized to receive an air filter element. A spring clip fastener has a curved member extending from an attachment portion to a locking portion. The attachment portion is rotatably coupled, or pushed-into place, to the post such that the spring clip fastener is configured to rotate or push-in between a disengaged position and an engaged position. The attachment portion is configured to cooperate with the retention feature to retain the fastener in the disengaged position, and the locking portion engages the flange to retain the fastener in the engaged position.

In another embodiment, a vehicle component housing is provided with a first shell having a mount defining a retention feature, and a second shell having a flange. A fastener has a hooked region rotatably supported by the mount and configured to selectively mate with the retention feature to retain the fastener in a disengaged position. The fastener has a locking member configured to mate with the flange to retain the fastener in an engaged position.

Various embodiments according to the present disclosure have associated, non-limiting advantages. For example, a vehicle component housing may need to be periodically opened, for example, for routine vehicle maintenance or when an internal component such as a filter element or fuse requires replacement or inspection. To open the housing, the fasteners must be moved from the engaged position E to a disengaged position D. The present disclosure provides a retention feature on one of the shells that interacts with the fastener, such as a spring clip fastener, to retain the spring clip fastener in the disengaged position D. In a conventional system, spring clip fasteners are positioned such that they are rotatably connected to a lower shell, and gravitational forces act on the spring clip fasteners to hold the fasteners away from the edges of the housing shells when servicing. In various examples, and according to the present disclosure, the housing may be oriented or positioned within the vehicle such that gravitational forces do not hold the spring clip fasteners away from the edges or act on the spring clip fasteners to move them towards the edges of the shells. For example, limited packaging space in the vehicle may require a specific installation orientation for the assembly. In this scenario, the spring clip fasteners may overlap the edge of one or more of the shells, and interfere with closing of the housing. Previously, the user or technician had to hold or otherwise manage one or more fasteners while trying to close the housing, leading to additional time for component replacement or maintenance, and the possibility of pinching a fastener between the shells and the sealing member and/or general assembly errors.

DETAILED DESCRIPTION

As required, detailed embodiments of the present disclosure are provided herein; however, it is to be understood that the disclosed embodiments are merely exemplary and may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

Figure 1:
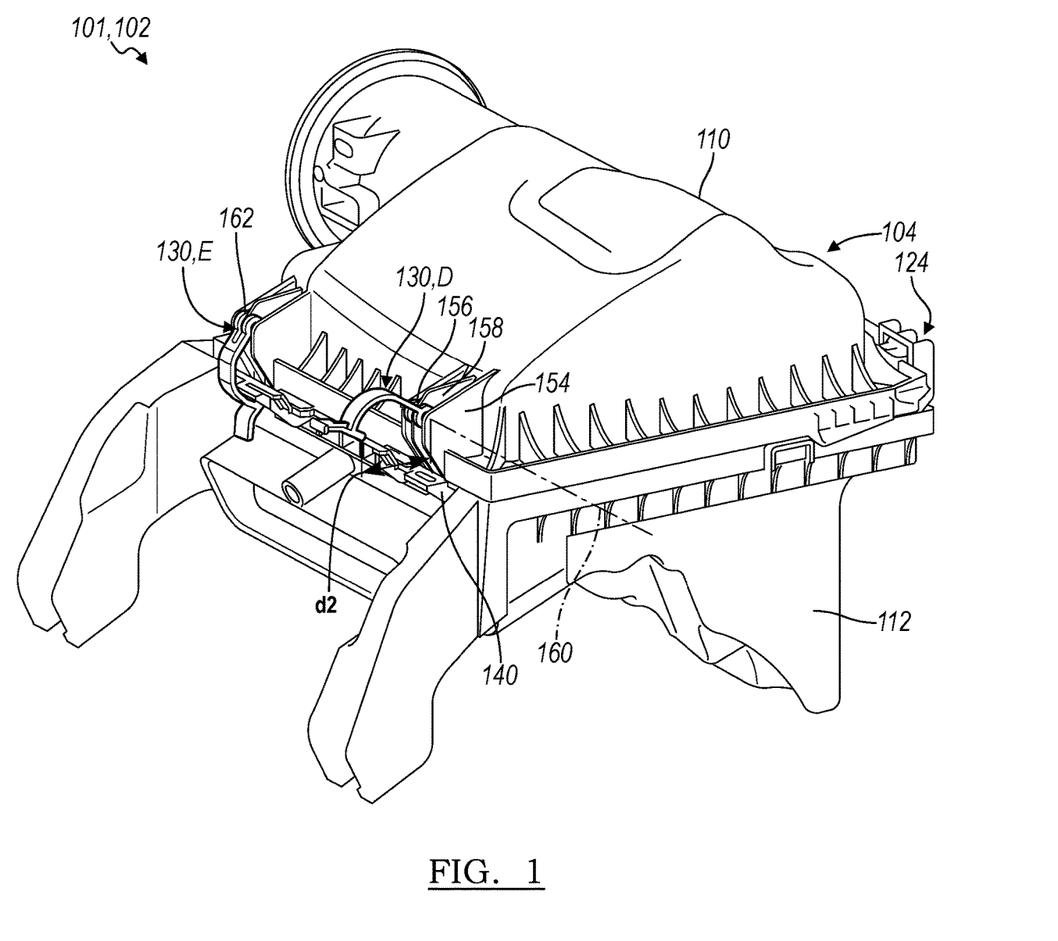
FIG. 1 illustrates a perspective view of a vehicle component housing and assembly according to an embodiment.
Figure 2:
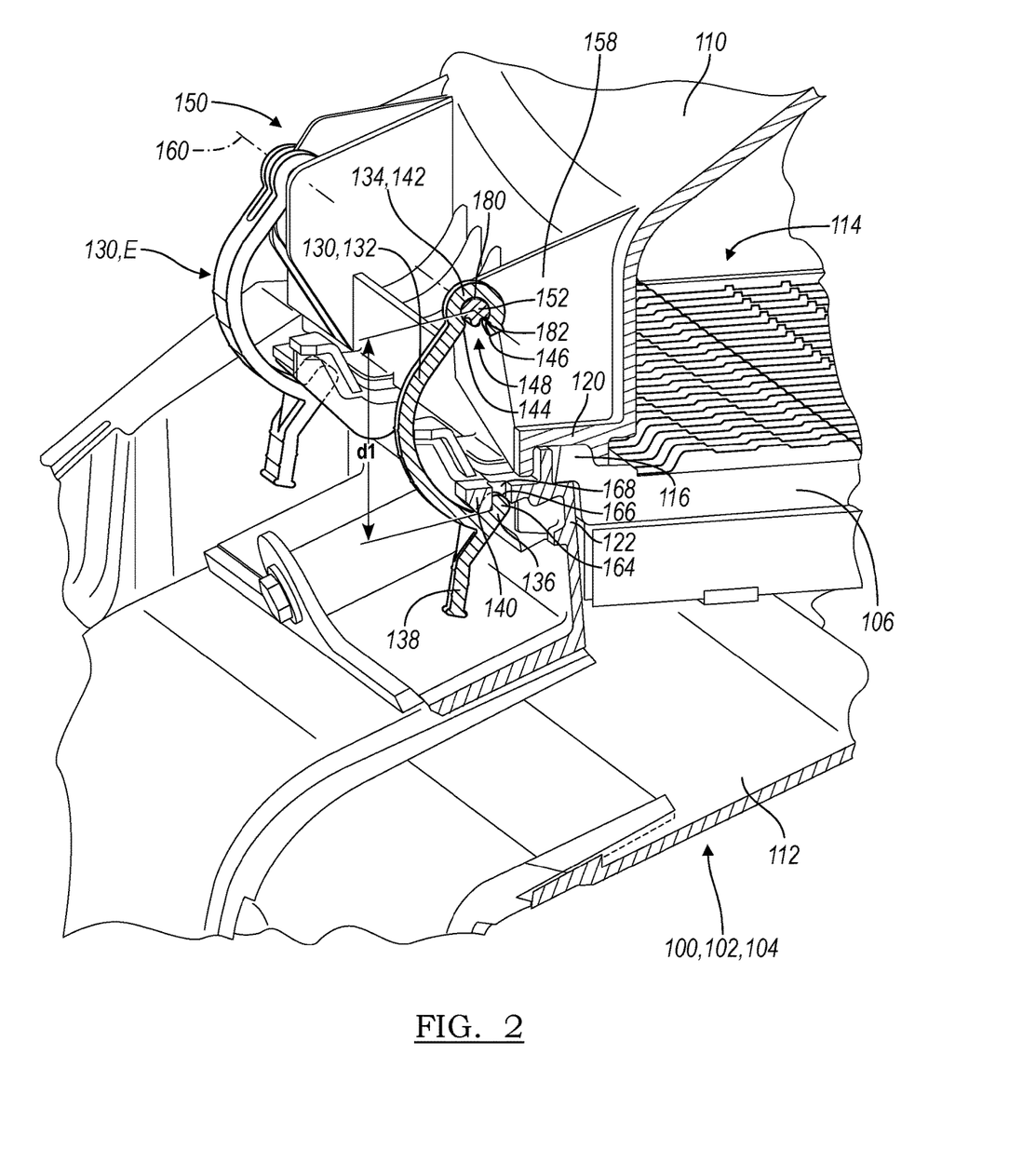
FIG. 2 illustrates a sectional view of the housing and assembly of FIG. 1.

FIGS. 1-2 illustrate a perspective view of an assembly 100 for use with a vehicle component or vehicle system. In one example, the assembly 100 is provided as an air filtration assembly 102 for an air filtration system for a vehicle, such as an air filtration system associated with an air intake system for an internal combustion engine or a cabin air intake system associated with a heating, ventilation, and air-conditioning system (HVAC). In another example, the assembly 100 is provided as an electrical fuse box in an electrical system in a vehicle. The assembly 100 is described below with reference to a vehicle air filtration assembly 102 as a non-limiting example of an implementation of the present disclosure. For an air filtration system 102, unfiltered air flows into the housing 104, through a filter element 106, and filtered air exits the housing 104.

The assembly 100 has a housing 104 with a first shell 110 and a second shell 112. The housing 104 defines various mounting points such that the housing 104 may be installed and positioned within the vehicle. In one example, the first shell 110 provides an upper filter element casing, and the second shell 112 provides a lower filter element casing, with the upper shell 110 positioned above the lower shell 112 when the assembly is positioned within the vehicle, for example, in the orientation as shown in FIG. 1. In other examples, the first and second shells 110, 112 may be otherwise oriented relative to one another and relative to the vehicle.

The first and second shells 110, 112 cooperate to define an interior region 114 sized to receive an air filter element 106, or another vehicle component or sub-component. The first and second shells 110, 112 may define one or more apertures or ports for connection to other vehicle components or systems, or for use with one or more vehicle sensors. For example, with an air filtration system 102, the housing is provided with an air inlet port and an air outlet port. In another application, the system 100 may be used as an electrical fuse box, and the housing 104 is provided with at least one port associated with an electrical conduit or wiring harness. In one example, a compressible seal member 116 is positioned between the first and second casings 110, 112 to prevent outside debris, or the like from entering the interior region 114 of the housing.

The first and second shells 110, 112 may be mated along respective peripheral edges of each casing 110, 112, and each edge may include a flange 120, 122, respective that extends axially outward from the interior region 114 to increase the mating surface area for the associated shell 110, 112. The flanged edges 120, 122 are configured to mate with one another or provide a desired space therebetween to accommodate a seal and compress the compressed seal by a predetermined amount. One or both the flanged edges 120, 122 may be provided with a groove or other structure to locate or otherwise interact with the sealing member.

A sealing member 116 is positioned between the edges 120, 122 of the first and second shells 110, 112 prior to closing the housing 104 and connecting the shells. The sealing member 116 may integrally formed with the filter element as shown. In another example, the sealing member 116 is provided separately from the filter element or other internal component for the housing. The sealing member 116 may be formed from a compressible material such as elastomer, urethane, or felt or may be a formed area of the filter element itself.

The first shell 110 is connected to the second shell 112 via at least one fastener 130. The first shell 110 may be connected to the second shell 112 via a series of fasteners 130 positioned circumferentially about the outer perimeter of the housing 104. In one example and as described below, each fastener 130 is provided by a spring clip fastener. In other examples, each fastener 130 may be provided by a rigid clip or other fastener that is configured to be rotatably supported by the housing. Each of the fasteners 130 is configured to move between a disengaged position D and an engaged position E, with the fastener 130 moving in an inward direction relative to the housing 104 from the disengaged position D to the engaged position E. In the engaged position E, the fasteners 130 cooperate with the housing 104 to close the housing 104 and apply a compressive load to the seal 116. With the fastener 130 in the disengaged position D, the first and second casing 110, 112 may be moved apart from one another to open the housing 104 and access the interior region 114 of the housing.

In some examples, the first shell 110 is pivotally or rotationally coupled to the second shell 112 using a hinge mechanism 124, and one or more spring clip fasteners 130 are used to close the housing 104 and compress the seal 116. The number of spring clip fasteners 130 required for use with the assembly 100 may be based on providing a uniformly distributed compression load from the first and second shells 110, 112 onto the seal 116 to evenly compress the seal. The first and second casings 110, 112 and the spring clip fastener 130 may each be formed from a plastic or plastic composite material. In one example, the spring clip fastener 130 comprises at least one of PA, PBT, POM, PP, PET, PPS, and/or other suitable resin or composite material. The spring clip fastener 130 may additionally include a filler, such as 10-40% glass fiber filler, or another fiber or particle filler material. In other examples, the spring clip fasteners 130 may be formed from another elastic material or a metal.

The spring clip fastener 130 is formed by a curved member 132 extending from an attachment portion 134 to a locking portion 136. The fastener 130 may have additional features such as a lever 138 arranged to be adjacent to the locking portion 136 to allow for reduced forces to lock or unlock the locking portion 136 from the flange 140. The shapes and relative thicknesses of the various portions or regions of the fastener 130 may be provided such that the fastener has regions with predetermined rigidity or spring constants to provide a predetermined compression force between the upper and lower shells 110, 112. The spring clip fastener 130 is provided such that it may elastically deform when engaging the flange 140 of the second shell 112.

The attachment portion 134 includes a hook or a hooked region 142. The curved member 132 projects from a stem of the hook 142 and forms a radius surface 144. An end of the hook 146 is spaced apart from the radius 144 and the curved member 132 to define a gap 148 therebetween. The attachment portion 134 is configured to be rotatably coupled to the first casing 110 such that the fastener 130 may be rotated between the disengaged position D and the engaged position E. In various examples, the attachment portion 134 may be reversibly or removably coupled to the first casing 110 such that the fastener 130 may be replaced.

The hooked region 142 of the fastener may be reversibly connected to a mount 150 formed on one of the casings. In one example and as shown, the mount 150 is formed on the upper shell 110 or upper casing. The mount 150 has a post 152 or other feature that allows for rotational or pivotal movement of the fastener 130 relative to the upper casing 110 and between the engaged and disengaged positions.

The mount 150 includes two support flanges 154, 156 that each extend outwardly from the upper casing 110 and support the post 152 therebetween. In some embodiments, the mount 150 has an additional third support flange 158 extending outwardly from the upper casing 110, and sections of the post 152 are provided between each set of adjacent flanges 154, 156, 158 such that the post 152 is divided into a first section and a second section. The central flange 158 may provide additional strength and/or support to the mount 150. The first and second sections of the post 152 may be provided along a common longitudinal axis 160. In further examples, the mount 150 may be provided with additional flanges. The hooked region 142 of the fastener may be provided with a split design with a groove 162 to accommodate the central support flange 158.

The mount 150 also includes a retention feature. The retention feature is described below with respect to FIGS. 3-9 and according to various examples of the present disclosure. The attachment portion 134 of the fastener is configured to cooperate with the retention feature to retain the fastener 130 in the disengaged position D such that an external force from a user is required to move the fastener from the disengaged position towards the flange 140 and the engaged position E. In one example, the hooked region 142 is rotatably supported by the mount 150 and is configured to selectively mate or engage with the retention feature to retain the fastener 130 in the disengaged position.

The locking portion 136 or locking member has a locking arm 164 that is configured to engage the flange 140 on the second casing 112 to retain the fastener 130 in the engaged position E. When the fastener 130 is in the engaged position, the curved member 132 may be elastically deformed. In the engaged position, the locking arm 164 and locking portion of the spring clip fastener 130 engages the flange 140 of the second shell, or engages another flange or surface of the second shell 112, such as a surface extending from flanged edge 122.

The locking arm 164 of the spring clip fastener may have a rounded edge or end region 166 to provide for ease of operation as it provides a single line of contact with the flange 140 and may more easily slide over the outer edge of the flange 140 on the second shell. The outer edge of the flange 140 may likewise be curved or rounded. The flange 140 may be provided with a recess 168 or aperture that the locking arm 164 is seated within when the fastener 130 is in the engaged position to better retain the fastener 130. Alternatively, the flange 140 may be provided with an undercut angled wall to better retain the locking arm 164 of the fastener in the engaged position. The locking member 164 is configured to be spaced apart from the first and second shells 110, 112 with the fastener in the disengaged position D, with the curved member 132 extending away from the housing 104.

The first and second casings 110, 112 have a first distance d1 between the post 152 and the outer edge of the flange 140 on the second casing 112 with the seal 116 being uncompressed. The fastener 130 in the disengaged position D has a second distance d2 between the attachment portion 134 and the locking portion 136, with the second distance d2 being less than the first distance d1. In the engaged position, the curved member 132 may be stretched and/or elastically deformed to increase the distance between attachment and locking portions 134, 136. For example, the curved member 132 has a first curvature in the disengaged position D, and a second curvature in the engaged position E, with the second curvature being less than the first curvature. The shape of the curved member 132 additionally provides for distributed stresses along the member, and avoids a localized stress riser.

The housing 104 may need to be periodically opened, for example, for routine vehicle maintenance or when an internal component such as a filter element 106 or fuse requires replacement or inspection. To open the housing 104, the spring clip fasteners 130 must be moved from the engaged position E to a disengaged position D. Conventionally, the spring clip fasteners 130 are positioned such that they are rotatably connected to a lower shell 112, and gravitational forces act on the spring clip fasteners 130 to hold the fasteners away from the edges of the shells 110, 112 when servicing. In various examples, and according to the present disclosure, the housing 104 may be oriented or positioned within the vehicle such that gravitational forces do not hold the spring clip fasteners 130 away from the edges or act on the spring clip fasteners to move them towards the edges 120, 122. For example, limited packaging space in the vehicle may require a specific installation orientation for the assembly. In this scenario, the spring clip fasteners 130 may overlap the edge 120, 122 of one or more of the shells 110, 112, and interfere with closing of the housing 104. Previously, the user or technician had to hold or otherwise manage one or more fasteners 130 while trying to close the housing, leading to additional time for component replacement or maintenance, and the possibility of pinching a fastener 130 between the shells and the sealing member 116 and/or general assembly errors. The present disclosure provides a retention feature that interacts with the spring clip fastener 130 to retain the spring clip fastener in the disengaged position D.

The hook 142 has an internal wall 180 or inner face that interfaces with the mount 150. The internal wall 180 may form a generally cylindrical shape or define a generally cylindrical space in its natural, uninstalled state, with a radius to the internal wall having a variation of the profile of 5-10% of the maximum distance measured across the internal wall of the hook.

The fastener 130 is reversibly mounted to the post 152 of the mount 150 via the gap 148 by snap fitting the hook 142 over the post 152 via the gap. The post 152 may be provided with one or more slotted regions 182 or recesses to aid in attaching the fastener 130 to the post. The inner face 180 of the hook 142 is therefore supported by the post 152 such that the fastener 130 is rotatably supported by the mount 150.

Figure 3:
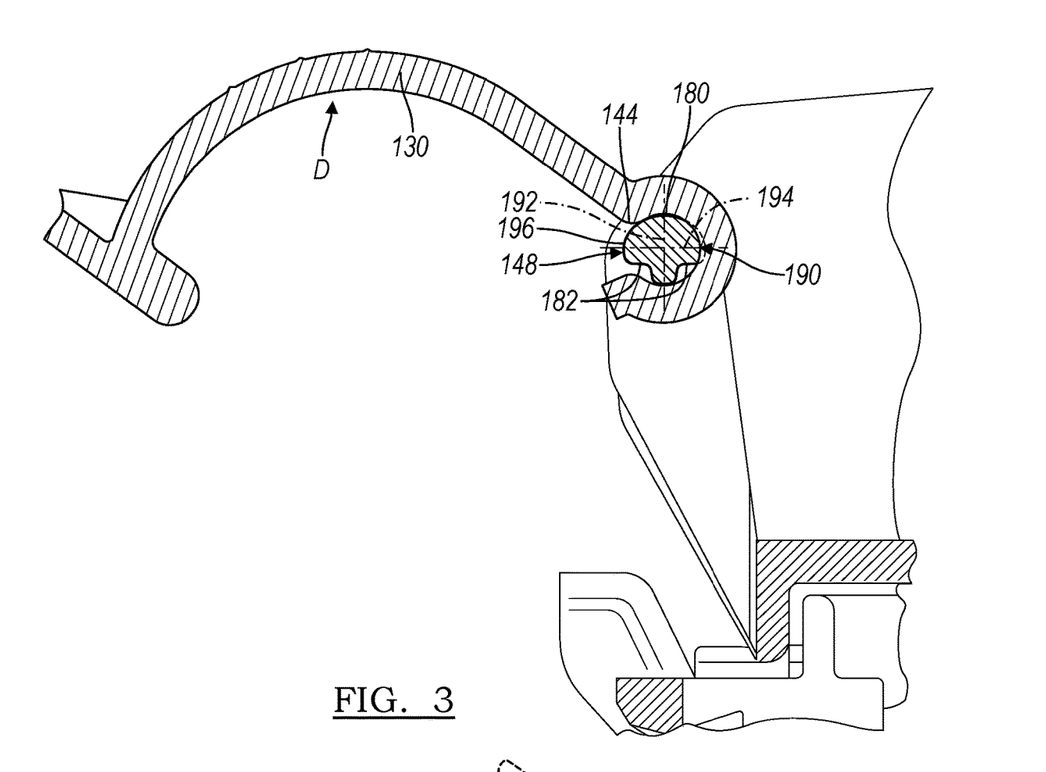
FIG. 3 illustrates a sectional view of a fastener and a mount with a retention feature according to an example and for use with the assembly of FIG. 1.
Figure 4:
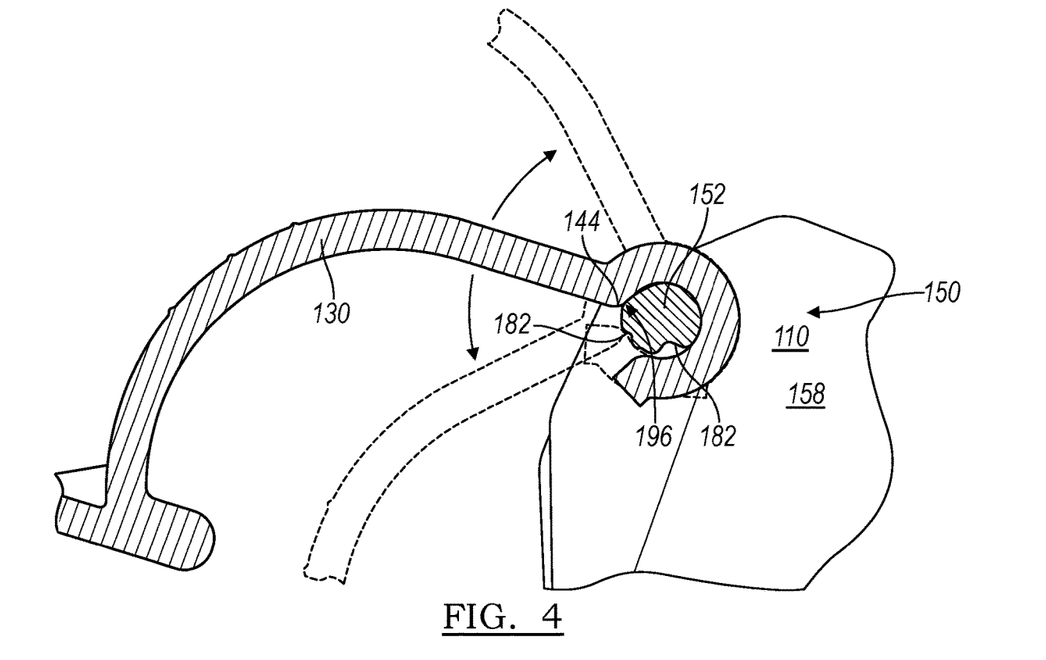
FIG. 4 illustrates a sectional view of a fastener and a mount with a retention feature according to an example and for use with the assembly of FIG. 1.
Figure 5:
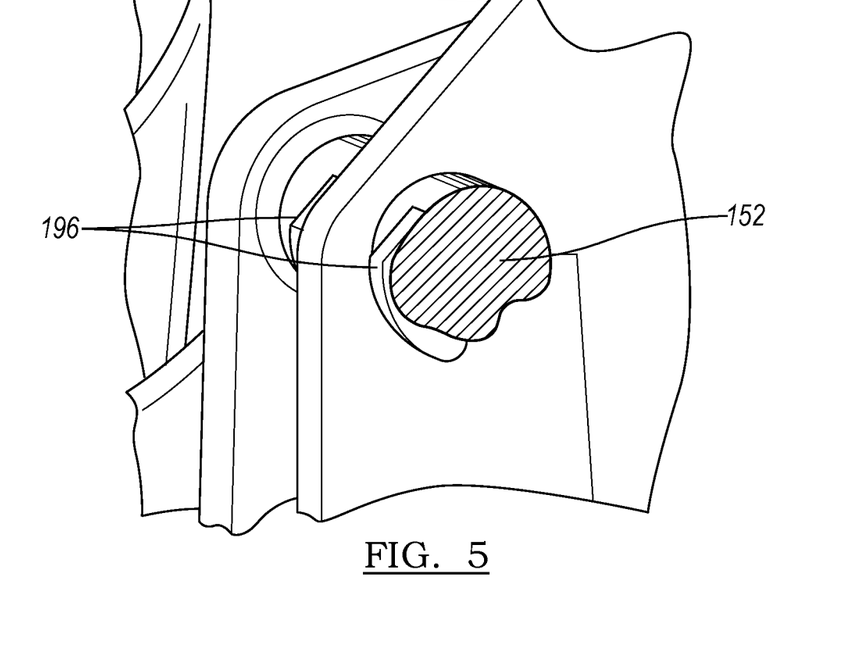
FIG. 5 illustrates another sectional view of a mount with a retention feature according to an example and for use with the assembly of FIG. 1.

FIGS. 3-5 illustrate examples according to the present disclosure with the post having an eccentric or ovalized cross-sectional shape 190 such that the eccentricity or ovalized shape forms the retention feature. In the present disclosure, ovalized includes a rounded shape that is non-circular and elongated, and may include an ellipse, an oval, or another simple, convex, closed, curve. The ovalized shape may additionally include various recesses 182 that aid in the attachment of the hook to the post.

For example, in FIG. 3, the inner face 180 or internal wall of the hook may have a first diameter in a natural, unstressed state, and the ovalized shape 190 of the post 152 may be defined by the first diameter along a minor axis 192 and a second diameter along a major axis 194, with the second diameter being greater than the first diameter. The radius 144 of the hook 142 rests on the outer region 196 of the post 152 when the fastener is in the disengaged position, such that the ovalized shape 196 of the post 152 prevents the fastener 130 from further rotation without an additional downward force input onto the fastener. As shown in FIG. 4, an ovalized ramp section or eccentric section 196 may be provided on the outer surface of the post 152 to interface with the radius 144 of the fastener 130 only in the location associated with retaining the fastener in the disengagement position D.

The eccentric feature or section 196 may be formed along a width of the post, or may be provided as a project along only a section of the post 152, as shown in FIG. 5. In FIG. 5, post 152 is provided with the eccentric feature as a protrusion 196 extending outwardly therefrom to define the retention feature. The protrusion 196 may be positioned adjacent to one of the relief recesses or notches 182 provided on the post, with the notches 182 used in providing relief for the hooked region 142 during the snap installation onto the post 152.

Figure 6:
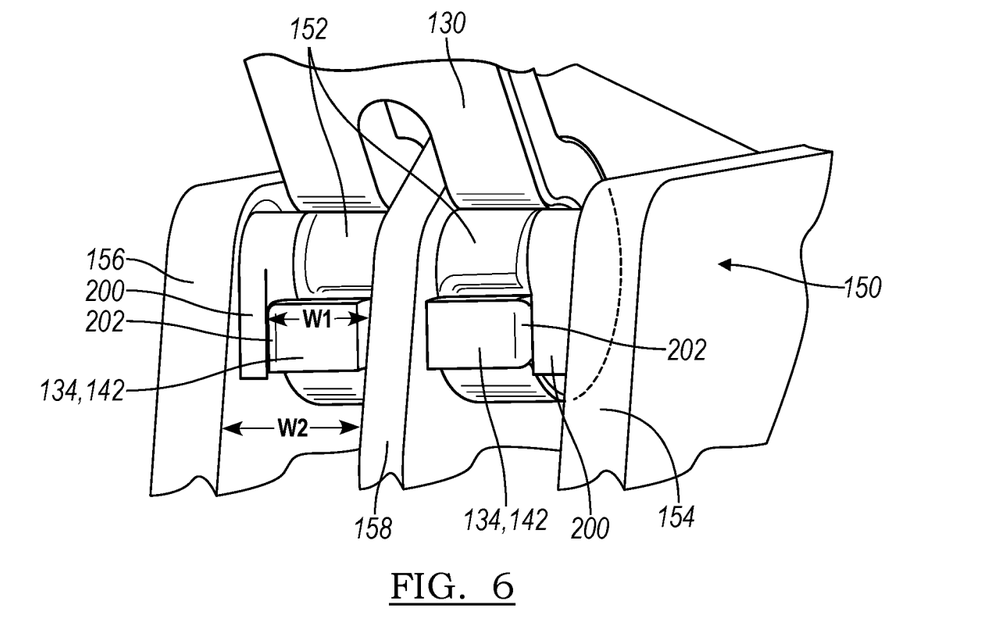
FIG. 6 illustrates a perspective view of a fastener and a mount with a retention feature according to an example and for use with the assembly of FIG. 1.

FIG. 6 illustrates an example according to the present disclosure where the mount provides at least one protrusion or projection 200 extending outwardly therefrom to provide the retention feature, and the attachment portion 134 selectively interacts with the at least one protrusion to 200 retain the fastener in the disengaged position.

In FIG. 6, the first and second flanges 154, 156 have protrusions 200 extending outwardly therefrom to define the retention feature. In other examples, the mount 150 may have only one protrusion 200 from one flange, or the protrusion 200 may be alternatively or additionally provided on the post 152. The hook 142 is sized for an interference fit with the protrusion 200 in the disengaged position, and the hook 142 is spaced apart from the protrusion 200 in the engaged position. The side wall 202 of the hook 142 may engage with the protrusions 200 for the interference fit, for example a width of the hook 142 may be greater than a width between adjacent flanges with a protrusion w1, and a width of the hook may be less than a width between adjacent flanges away from the protrusion w2.

Figure 7:
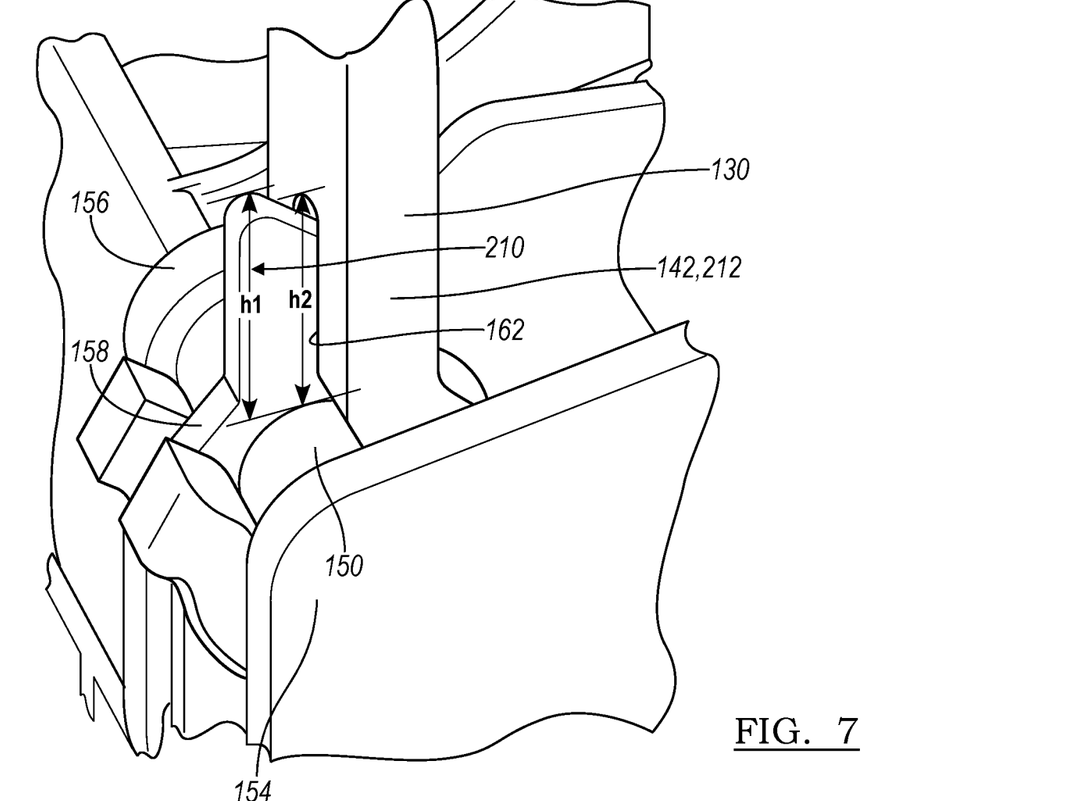
FIG. 7 illustrates a perspective view of a fastener and a mount with a retention feature according to an example and for use with the assembly of FIG. 1.

In FIG. 7, the central flange 158 is provided with a projection 210 or protrusion extending away from the post 152 and away from the flanged edge 122 of the first shell 110. The hooked region 142 of the fastener 130 is split into first and second hooked portions 212 that are separated by a groove 162 such that the central flange 158 is positioned in the groove 162 between the first and second hooked portions 212 when the fastener is installed onto the post. A height of the protrusion h1 is greater than a length of the groove h2 such that the groove 162 of the hooked region is configured to snap over the protrusion 210 when being positioned in the disengaged position D. The protrusion 210 therefore selectively engages and retains the fastener 130 in the disengaged position as shown.

Figure 8:
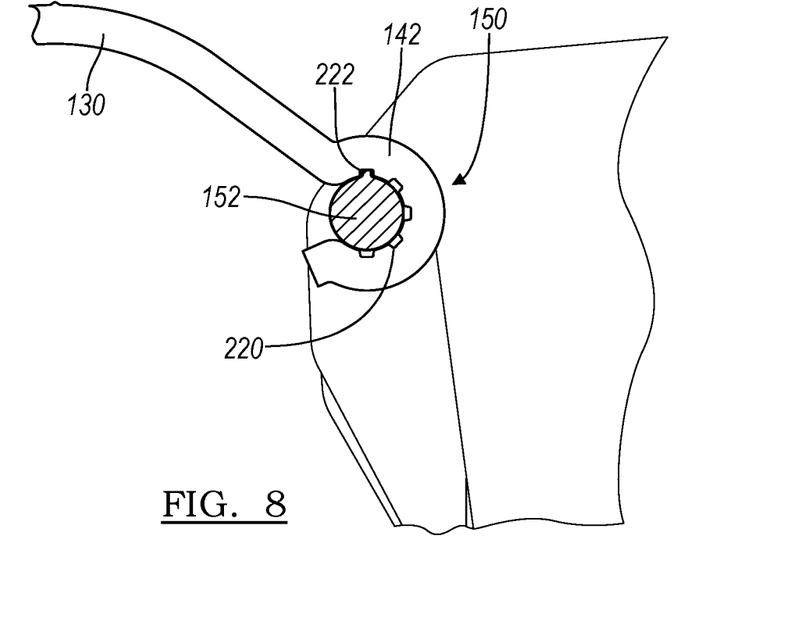
FIG. 8 illustrates a sectional view of a fastener and a mount with a retention feature according to an example and for use with the assembly of FIG. 1.

As shown in FIG. 8, the retention feature is provided by a notch 220 and rib 222 feature on the post 152 and inner face 180 of the hook 142. One of the outer surface of the post 152 and the inner face 180 of the hooked region defines a rib 222, and the other of the outer surface of the post 152 and the inner face 180 of the hooked region defines a notch 220. The rib 222 is configured to be positioned within the notch 220 to selectively engage and retain the fastener 130 in the disengaged position D as shown. When the rib 222 is away from the notch 220, the distal end region of the rib 222 rests on and slides over the surface of the opposed component. More than one rib 222, and/or more than one notch 220 may be provided on the post 152 and the hooked region 142 such that the fastener 130 may be retained in one or more intermediate positions between the engaged position E and the disengaged position D. In other embodiments, post 152 may be provided with another cross-sectional shape, such as triangular, square, hexagonal, polygonal, or other shape; and the hooked region 142 is defined by a corresponding shape that mates with the post 152 in the engaged position E, and also mates or otherwise interfaces with the post 152 to selectively engage and retain the fastener 130 in the disengaged position D.

Figure 9:
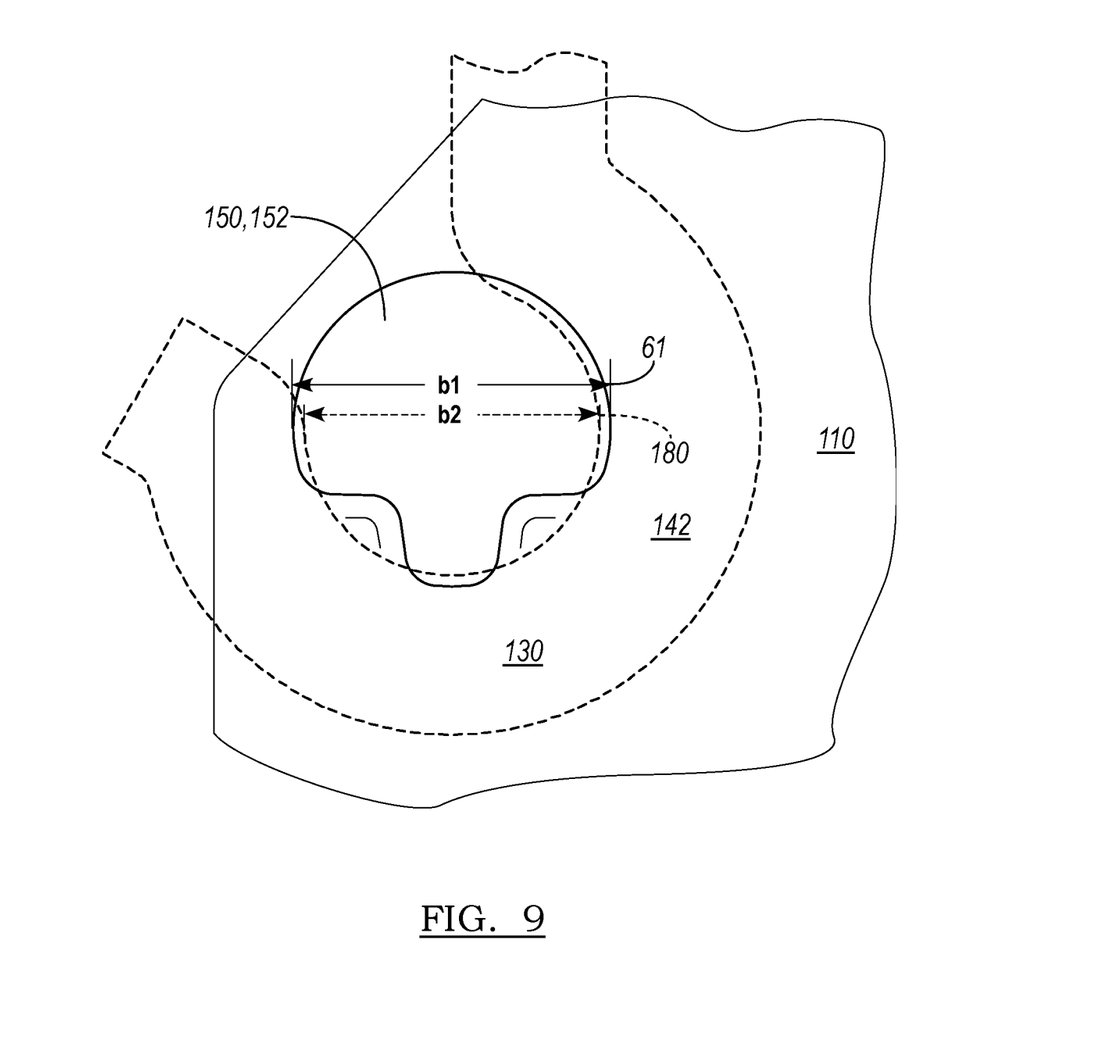
FIG. 9 illustrates a sectional view of a mount according to an example and for use with the assembly of FIG. 1.

In FIG. 9, the hooked region 142 of the fastener 130 is illustrated schematically and in broken lines, and is illustrated as being overlaid on the mount 150 in a natural uninstalled state relative to the mount 150 for comparison purposes of the relative dimensions. An outer diameter b1 of the post 152 may be greater than a diameter b2 of the inner face 180 of the hooked region 142, such that the hooked region 142 is expanded over the post 152 when installed. This results in the hooked region 142 having an interference fit or friction fit with the post 152 regardless of its position, such that it will remain in the disengaged position D or any other position when placed there.

While exemplary embodiments are described above, it is not intended that these embodiments describe all possible forms of the disclosure. Rather, the words used in the specification are words of description rather than limitation, and it is understood that various changes may be made without departing from the spirit and scope of the disclosure. Additionally, the features of various implementing embodiments may be combined to form further embodiments of the disclosure.

What is claimed is:

1. A vehicle component housing comprising:
a first shell having a mount defining a retention feature and a post, wherein the mount is further defined by first and second support flanges extending outwardly from the first shell, with the post extending between the first and second support flanges, wherein the mount defines a third support flange, the second support flange being positioned between the first and third support flanges, the post of the mount further extending between the second and third support flanges;
a second shell having a flange; and
a fastener having a hooked region rotatably supported by the mount and configured to selectively mate with the retention feature to retain the fastener in a disengaged position, and a locking member configured to mate with the flange to retain the fastener in an engaged position, wherein an inner face of the hooked region defines a cylindrical space, and wherein the inner face of the hooked region is supported by the post such that the fastener is rotatably supported by the mount, wherein the hooked region is split into a first and second hooked portions separated by a groove; and
wherein the second support flange defines a protrusion extending away from the post, wherein a height of the protrusion is greater than a length of the groove such that the groove of the hooked region is configured to snap over the protrusion such that the protrusion selectively engages and retains the fastener in the disengaged position.

2. The housing of claim 1 wherein the first shell is an upper shell and the second shell is a lower shell.

3. The housing of claim 1 wherein the locking member is configured to extend away from the first and second shells with the fastener in the disengaged position.

4. A vehicle component housing comprising:
a first shell having a mount defining a retention feature and a post;
a second shell having a flange; and
a fastener having a hooked region rotatably supported by the mount and configured to selectively mate with the retention feature to retain the fastener in a disengaged position, and a locking member configured to mate with the flange to retain the fastener in an engaged position, wherein an inner face of the hooked region defines a cylindrical space, and wherein the inner face of the hooked region is supported by the post such that the fastener is rotatably supported by the mount;
wherein one of an outer surface of the post and the inner face of the hooked region defines a rib;
wherein the other of the outer surface of the post and the inner face of the hooked region defines a notch; and
wherein the rib is configured to be selectively positioned within the notch to selectively engage and retain the fastener in the disengaged position.

5. The housing of claim 4 wherein the notch is a first notch;
wherein the other of the outer surface of the post and the inner face of the hooked region defines a second notch; and
wherein the rib is configured to be selectively positioned within the second notch to selectively engage and retain the fastener in an intermediate position between the disengaged and engaged positions.

6. The housing of claim 4 wherein the rib is a first rib;
wherein the one of the outer surface of the post and the inner face of the hooked region defines a second rib; and wherein the second rib is configured to be selectively positioned within the notch to selectively engage and retain the fastener in an intermediate position between the disengaged and engaged positions.

7. The housing of claim 4 wherein the first shell is an upper shell and the second shell is a lower shell.

8. The housing of claim 4 wherein the locking member is configured to extend away from the first and second shells with the fastener in the disengaged position.

9. The housing of claim 4 wherein the first shell mates with the second shell via a compressible seal.

10. The housing of claim 9 wherein the first and second shells enclose an interior region sized to receive an air filter element.

11. The housing of claim 4 wherein the fastener is a spring clip fastener having a curved member extending from the hooked region to the locking member.

12. The housing of claim 11 wherein a gap is formed between an end of the hooked region and the curved member, wherein the hooked region is reversibly mounted to the post of the mount via the gap.

13. The housing of claim 1 wherein the first shell mates with the second shell via a compressible seal.

14. The housing of claim 13 wherein the first and second shells enclose an interior region sized to receive an air filter element.

15. The housing of claim 1 wherein the fastener is a spring clip fastener having a curved member extending from the hooked region to the locking member.

16. The housing of claim 15 wherein a gap is formed between an end of the hooked region and the curved member, wherein the hooked region is reversibly mounted to the post of the mount via the gap.

* * * * *